(12) United States Patent
Li et al.

(10) Patent No.: US 10,896,572 B2
(45) Date of Patent: Jan. 19, 2021

(54) SYSTEM AND METHOD FOR AUTOMATED USER ASSISTANCE

(71) Applicant: IGT, Las Vegas, NV (US)

(72) Inventors: Can Li, Beijing (CN); Tingting Zhan, Beijing (CN); Xuehai Zhang, Beijing (CN); Robert Li, Beijing (CN); Yuehua Leng, Beijing (CN)

(73) Assignee: IGT, Las Vegas, NV (US)

( * ) Notice: Subject to any disclaimer, the term of this patent is extended or adjusted under 35 U.S.C. 154(b) by 87 days.

(21) Appl. No.: 16/392,025

(22) Filed: Apr. 23, 2019

(65) Prior Publication Data

US 2020/0342707 A1 Oct. 29, 2020

(51) Int. Cl.
*G07F 17/32* (2006.01)
*G06Q 50/34* (2012.01)
*G06F 9/54* (2006.01)
*H04W 4/80* (2018.01)

(52) U.S. Cl.
CPC ............ *G07F 17/323* (2013.01); *G06F 9/542* (2013.01); *G06Q 50/34* (2013.01); *G07F 17/3223* (2013.01); *H04W 4/80* (2018.02)

(58) Field of Classification Search
CPC .... G07F 17/323; G07F 17/3223; H04W 4/80; G06F 9/542; G06Q 50/34
USPC .......................................................... 463/40
See application file for complete search history.

(56) References Cited

U.S. PATENT DOCUMENTS

| 8,133,105 | B2* | 3/2012 | Walker ................ G07F 17/3227 463/16 |
| 8,210,931 | B2* | 7/2012 | Alderucci ............ G06Q 40/123 463/25 |
| 8,408,989 | B2* | 4/2013 | Bennett ............... G07F 17/3227 463/20 |
| 9,144,739 | B2* | 9/2015 | Wilkinson .............. G07F 17/32 |
| 2015/0065214 | A1* | 3/2015 | Olson ..................... A63F 13/65 463/9 |
| 2015/0364012 | A1* | 12/2015 | Sipaila .................. G07F 17/326 463/13 |
| 2019/0340879 | A1* | 11/2019 | Williams ............ G07F 17/3225 |

\* cited by examiner

*Primary Examiner* — Allen Chan
(74) *Attorney, Agent, or Firm* — Sheridan Ross P.C.

(57) ABSTRACT

The present disclosure relates generally to an improved gaming machine that facilitates automated or semi-automated user interactions therewith. Illustratively, a method is provided that includes generating a game history message for delivery to a mobile device, transmitting the game history message to the mobile device, receiving a wager strategy message from the mobile device, and extracting, from the wager strategy message, a wager strategy for the player to be applied at the gaming machine for a game of chance to be played after receiving the wager strategy message. The method may further include executing the game of chance by placing a wager for the player on the game of chance in accordance with the wager strategy extracted from the wager strategy message.

20 Claims, 8 Drawing Sheets

SYSTEM AND METHOD FOR AUTOMATED USER ASSISTANCE

BACKGROUND

The present disclosure is directed toward a gaming machines and, in particular, automated and semi-automated user assistance provided in connection with a gaming machine.

Players of casino games such as table games, card games, dice games, roulette, Electronic Gaming Machines (EGMs), and other games of chance often fall into two categories: (1) casual players and (2) repeat/serious players. The casual player is a type of player that enjoys the social aspects of casino games whereas the repeat/serious players often try to apply a strategy when playing the casino games.

BRIEF SUMMARY

In certain embodiments, the present disclosure relates to a method of facilitating user interactions with a gaming machine. In some embodiments, the method includes generating, with a processor of the gaming machine, a game history message for delivery to a mobile device, where the game history message includes a game history description for a finite set of game outcomes that have occurred at the gaming machine. The method may further include transmitting, with a communication interface of the gaming machine, the game history message to the mobile device and then receiving, with the communication interface, a wager strategy message from the mobile device. The method may further include extracting, with the processor and from the wager strategy message, a wager strategy for the player to be applied at the gaming machine for a game of chance to be played after receiving the wager strategy message and then executing, with the processor, the game of chance, where executing the game of chance includes placing a wager for the player on the game of chance in accordance with the wager strategy extracted from the wager strategy message. The method may then further include determining, with the processor, an outcome for the game of chance and an outcome specific to the wager placed for the player and notifying, with the processor, the mobile device of the player of the outcome specific to the wager placed for the player.

In some embodiments, the present disclosure also relates to a gaming machine including a communication interface connectable with a communication network, a processor coupled with the communication interface, and a computer-readable storage medium, coupled with the processor, including instructions that are executable by the processor. In some embodiments, the instructions include: instructions that execute a game of chance; instructions that generate a game history message for delivery to a mobile device of a player, where the game history message includes a game history description; instructions that transmit, via the communication interface, the game history message to the mobile device; instructions that receive a wager strategy message from the mobile device and then extract a wager strategy for the player to be applied at the gaming machine during execution of the game of chance to be played after receiving the wager strategy message; instructions that determine, after execution of the game of chance, an outcome for the game of chance and an outcome specific to a wager placed for the player in accordance with the wager strategy; and instructions that notify the player of the outcome specific to the wager placed for the player.

In some embodiments, the present disclosure also relates to a system that includes a processor and a computer-readable storage medium, coupled with the processor, including instructions that are executable by the processor. In an example, the instructions may include: instructions that pair a mobile device of a player with a gaming machine; instructions that generate a game history message for delivery to the mobile device, where the game history message includes a game history description for a finite set of game outcomes that have occurred at the gaming machine; instructions that transmit the game history message to the mobile device; instructions that receive a wager strategy message from the mobile device and then extract a wager strategy for the player to be applied at the gaming machine during execution of a game of chance to be played after receiving the wager strategy message; instructions that determine, after execution of the game of chance, an outcome for the game of chance and an outcome specific to a wager automatically placed for the player in accordance with the wager strategy; and instructions that notify the player of the outcome specific to the wager placed for the player.

Additional features and advantages are described herein and will be apparent from the following Description and the figures.

DETAILED DESCRIPTION

Figure 1:
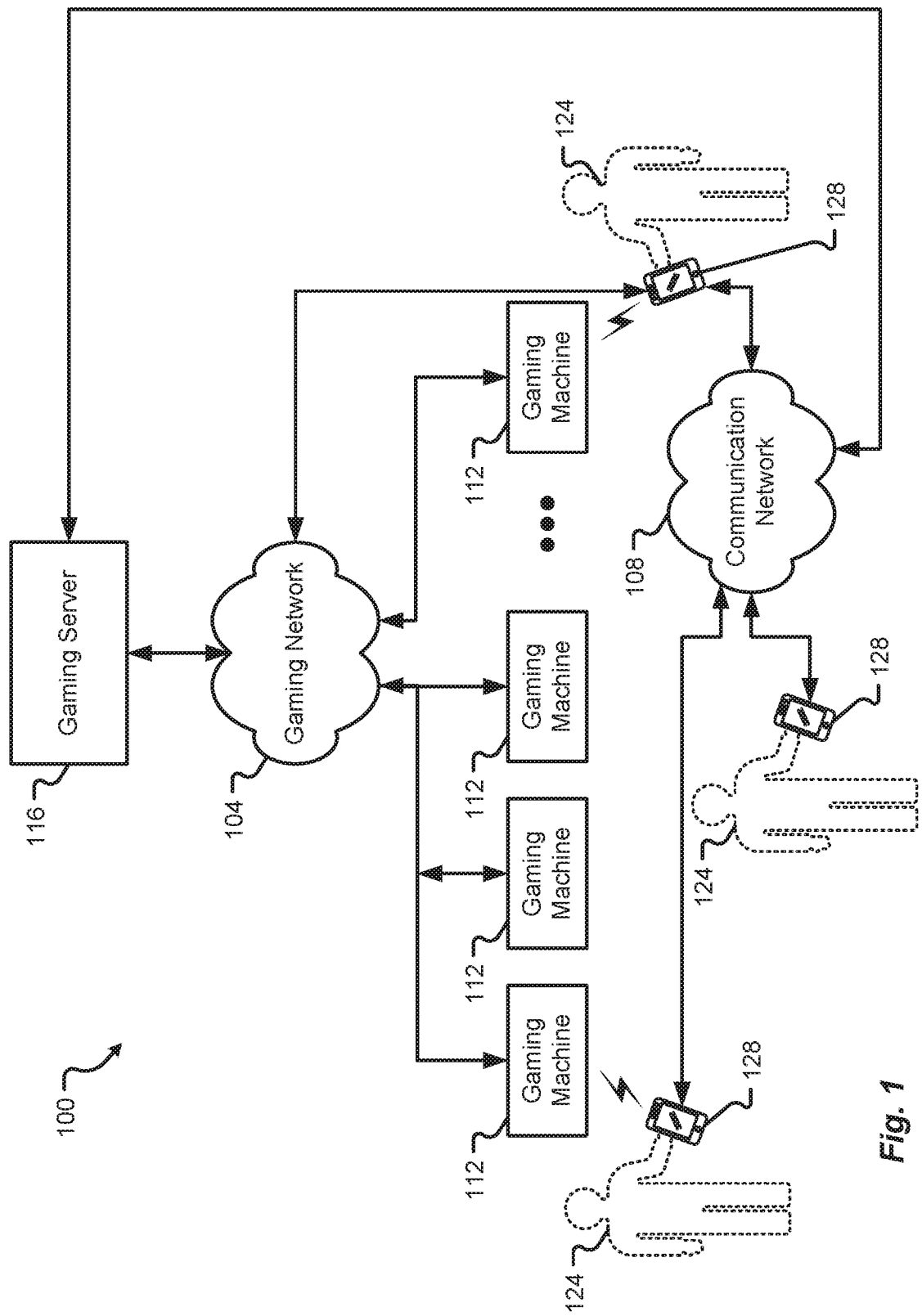
FIG. 1 illustrates a gaming system in accordance with embodiments of the present disclosure.

Embodiments of the present disclosure will be described in connection with a gaming machine, mobile devices, servers, a virtualized table game, a physical table game, and other computational devices. While embodiments of the present disclosure will be described in connection with the example of an EGM facilitating a game of chance, such as a table game, card game, dice game, or the like, it should be appreciated that embodiments of the present disclosure are not so limited. For instance, other types of computational devices, such as portable user devices, smartphones, tablets, laptops, Personal Computers (PCs), wearable devices, etc. may be configured with gaming machine functionality (e.g., to implement a game of chance), similar to a gaming machine as described herein. Furthermore, it should be appreciated that embodiments of the present disclosure may apply to gaming machines that operate games of chance other than table games, card games, dice games, or the like.

For instance, embodiments of the present disclosure may be used in connection with any type of game such as bingo, keno, slots, roulette, etc.

In many situations, players of a casino game (e.g., an EGM, a Video game Gambling Machine (VGM), table game, roulette game, card game, or other game of chance) may tend to develop habits of collecting and analyzing history records for the casino game and then try to find a potential trend. If the player is able to identify a trend, then the player may speculate on the next outcome of the casino game and place a wager. Some casino games make a game history visible to players or other individuals passing by the casino game, usually on some sort of display device attached or adjacent to the casino game. The information displayed on these types of display devices is often limited to a small number of game outcomes. Because some players may spend more time collecting game history rather than placing wagers on the game, there are fewer wagers placed in total. Additionally, because these observing players often rely on knowing a complete history of a casino game before placing a wager, the players may not place many wagers only because the player is unable to personally observe the outcomes for multiple casino games at the same time. Moreover, any distractions to the player (e.g., drinking, talking, eating, etc.) will cause the player to miss an opportunity to place a wager that the player may have otherwise placed based on the recent history of the casino game. All of this results in lost opportunities for the casino operator.

Embodiments of the present disclosure aim to solve these and other problems encountered in a gaming environment, such as a casino or virtual gaming environment. In some embodiments, a casino game, such as a gaming machine, is provided with the ability to store and communicate game history records (e.g., historical game outcomes) to a user's/player's mobile device. This game history record may be simultaneously presented on a display device associated with the casino game. It should be appreciated that the information displayed on the display device associated with the casino game and the information provided to the mobile device may be the same or different. For instance, the mobile device may receive a history record with more historical game outcomes as compared to the number of historical game outcomes displayed by the display device associated with the casino game. Alternatively, the number of historical game outcomes displayed by the display device associated with the casino game may be greater than the number of historical game outcomes provided to the mobile device.

In some embodiments, the history records provided to the mobile device may assist the user with quickly and accurately understanding a history of a casino game. This improved understanding alone may cause the player to place more wagers at the casino game. Alternatively or additionally, a player may be allowed to utilize a fully-automated or semi-automated wager assistance feature that is configured, based on preferences of the player, to track the historical game outcomes, determine if the historical game outcomes satisfy an action condition (e.g., a condition or set of conditions defined by a user to place a particular type of wager, increase a particular type of wager, decrease a particular type of wager, remove a particular type of wager, etc.), and then automatically or semi-automatically implement the action prior to a next execution of the casino game. It should be appreciated that the fully-automated or semi-automated wager assistance feature may be modified by a player at any time and may be configured to vary with time, possibly depending upon a player's available credit or previous wager history.

As a non-limiting example, consider a casino game, such as a dice game, where the action condition corresponds to the last four game outcomes being continuously small (e.g., the rolled value is less than half the possible total). The player's wager strategy may further define the action or actions to take in response to such an action condition. Some non-limiting examples of an action that can be defined by the player include notifying the player to manually place a wager or automatically placing the wager on behalf of the player. Alternatively or additionally, an existing method, such as Martingale, can be used as part of the defined action. After a player defines the appropriate action conditions and action(s), the player does not need observe every game outcome with the same attention to detail as they would otherwise have to exhibit without the assistance of the wager assistance feature. As long as the historical game outcome(s) continue to match the action condition, the automated or semi-automated wager assistance feature will enable the player to enjoy continued game play experiences.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. For instance, the components of a gaming server 116 may be distributed among a plurality of servers, where one or more of the servers enable management of a first game of chance (e.g., slot games played at the plurality of gaming machines 112) and one or more other servers manage and execute a second game of chance (e.g., a lottery game). The illustration of a single gaming server 116 is for ease of discussion and should not be construed as limiting embodiments of the present disclosure to a single-server architecture. Also for instance, a gaming machine 112 does not necessarily need to correspond to an EGM, but rather may correspond to any type of casino game such as a VGM, a table game, a card game, a dice game, a roulette game, or the like that is implemented using video, physical tables and game pieces, virtual reality, augmented reality, or a combination thereof.

As yet another example, it should be appreciated that components or instruction sets depicted and described as being incorporated in a particular system component can be provided in other system components without departing from the scope of the present disclosure. Specifically, components depicted and described as being included in a gaming machine 112 may be provided in a gaming server 116 and/or mobile device 128. Thus, functionality described in connection with one component (e.g., a gaming machine 112) of the system 100 can be provided in other components or multiple components of the system 100 (e.g., a gaming server 116 and/or mobile device 128).

The gaming system 100 is shown to include a gaming network 104 and a communication network 104. The gaming network 104 may correspond to a distributed set of devices that interconnect and facilitate machine-to-machine communications between one or multiple gaming machines 112 and the gaming server 116. The communication network 108 may correspond to a distributed set of devices that interconnect and facilitate machine-to-machine communications between the gaming server 116 and mobile devices 128 carried by users 124. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

A gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming machines 112 are configured to communicate with the gaming server 116 using devices that are owned and administered by the same entity that administers security settings of the gaming machines 112. As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming machines 112. Thus, the communication network 108 may be considered an untrusted or unsecure network from the perspective of the gaming network 104. The Internet is an example of the communication network 104 that constitutes an IP network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming machines 112 may be distributed throughout a single property or premises (e.g., a single casino floor) or the gaming machines 112 may be distributed among a plurality of different properties. In a situation where the gaming machines 112 are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming machines 112 may utilize the same or different types of communication protocols to connect with and communicate over the gaming network 104. It should also be appreciated that the gaming machines 112 may or may not present the same type of game to a user 124. For instance, the first gaming machine 112 may correspond to a gaming machine that presents a virtualized table game to the user 124 whereas a second gaming machine 112 may correspond to a gaming machine that presents a different type of table game or a video poker game to a user 124.

In some embodiments, the gaming machines 112 may be configured to communicate with a centralized management server in the form of the gaming server 116. The gaming server 116 may be configured to centrally manage games of chance played at the gaming machines 112 (e.g., table games, video poker, roulette, card games, dice games, slot games, lottery games, keno games, combinations thereof, etc.), monitor user 124 activity at the gaming machines 112, track user 124 association with a gaming machine 112, facilitate communications with users 124 via the gaming machines 112, facilitate communications with users 124 via the mobile devices 128, and/or perform any other task in connection with games played by a user 124 at the gaming machines 112.

In some embodiments, a user 124 may be enabled to enhance their experience with the gaming machines 112 via interactions with their personal mobile device 128. In some embodiments, a mobile device 124 may be configured to execute one or more games of chance that are also executable by a gamine machine 112. For instance, a user 124 may be allowed to play a video-based table game of chance (e.g., a card game, a roulette game, a dice game, etc.) at their mobile device 128 without ever having to physically engage a gaming machine 112. The mobile device 128 may correspond to a mobile communication device, such as a smartphone, tablet, laptop, PDA, wearable device, an augmented reality headset, a virtual reality headset, or the like.

In some embodiments, a mobile device 128 may be configured to communicate directly with a gaming machine 112. Direct communications may utilize a proximity-based communication protocol such as NFC, Bluetooth®, BLE, WiFi, or the like. Alternatively or additionally, the mobile devices 128 may be configured to communicate with other mobile devices 128 and/or the gaming server 116 via the communication network 108. Such communications may be secured (e.g., encrypted) or unsecured depending upon the nature of information exchanged during the communications. A mobile device 128 may correspond to a user's 124 personal device that uses an unsecured or untrusted communication network 108 or to a device issued to the user 124 during the user's visit at a particular casino, in which case the mobile device 128 may be administered with certain casino-approved security policies.

It should be appreciated that the gaming server 116 may or may not be co-located with the gaming machines 112. Further still, users 124 may be allowed to carry multiple mobile devices 128, which may or may not be required to communicate or pair with a gaming machine 112.

FIG. 1 also depicts the possibility of some mobile devices 128 being paired with a gaming machine 112, thereby enabling communications to flow between the mobile device 128 and gaming machine 112. This communication may utilize a proximity-based communication protocol, such as Bluetooth, BLE, NFC, WiFi, etc. FIG. 1 further shows that one or more mobile devices 128 may not necessarily be paired with a gaming machine 112, but such mobile devices 128 may still be configured to communicate with the gaming server 116 via the communication network 108.

Figure 2:
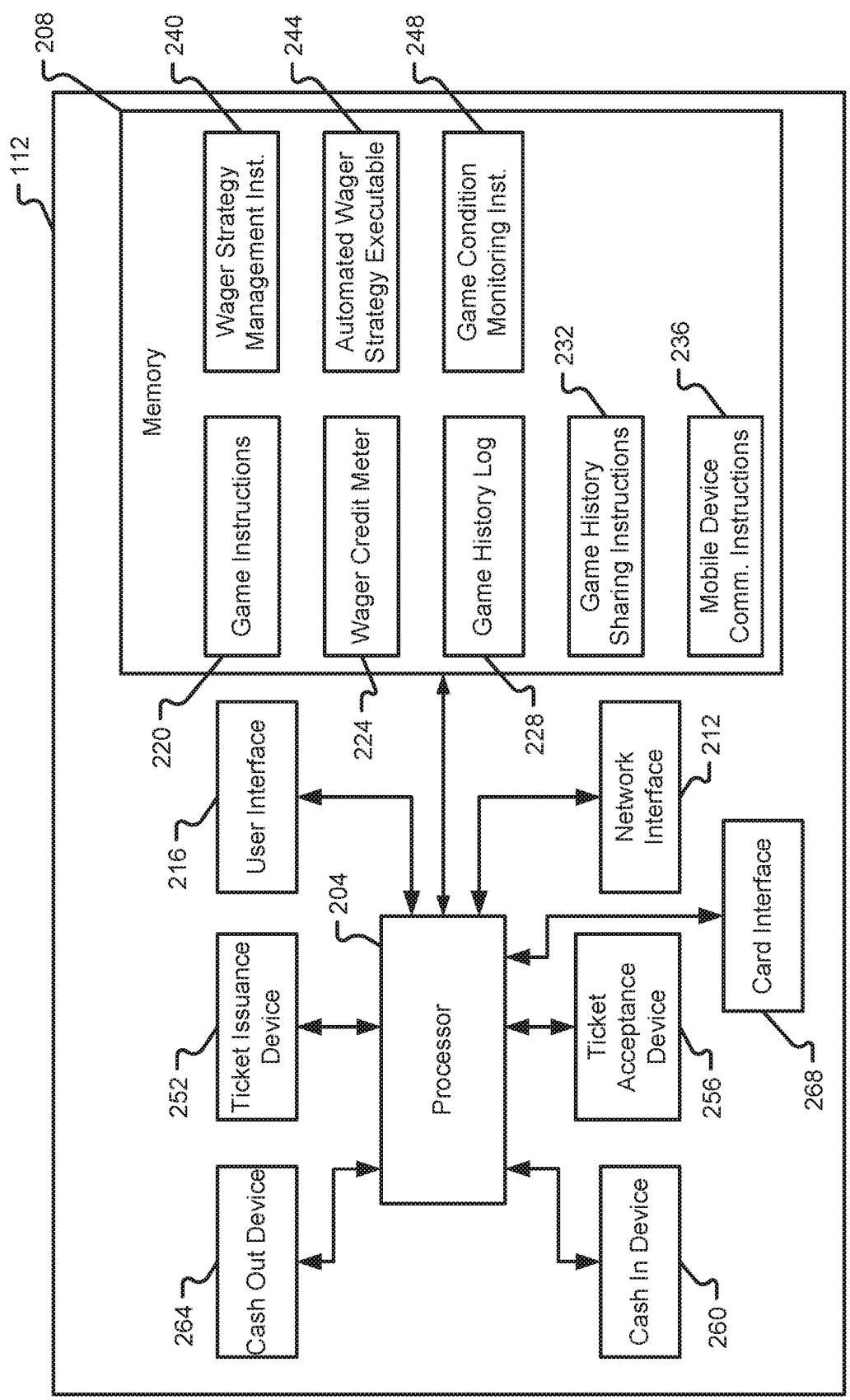
FIG. 2 illustrates a gaming machine in accordance with embodiments of the present disclosure.

With reference now to FIG. 2, additional details of the components that may be included in a gaming machine 112 will be described in accordance with at least some embodiments of the present disclosure.

A gaming machine 112 may correspond to a portable or non-portable device used for executing a gaming application or multiple different gaming applications without departing from the scope of the present disclosure. Non-limiting examples of a gaming machine 112 include a EGM, a VGM, a mobile communication device (e.g., a smartphone, laptop, wearable device, etc.), a kiosk, a laptop, a PC, etc. The illustrative gaming machine 112 depicted herein may include a support structure, housing or cabinet, which provides support for a plurality of displays, inputs, controls and other features of a conventional gaming machine. In some embodiments, a user 124 plays gaming machine 112 while sitting, however, the gaming machine 112 is alternatively configured so that a user can operate it while standing or sitting. The illustrated gaming machine 112 can be positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The gaming machine 112 can be constructed with varying cabinet and display configurations.

The gaming machine 112 is shown to include a processor 204, memory 208, a network interface 212, and a user interface 216. In some embodiments, the processor 204 may correspond to one or many microprocessors, CPUs, microcontrollers, Integrated Circuit (IC) chips, or the like. The processor 204 may be configured to execute one or more instruction sets stored in memory 208. In some embodiments, the instruction sets stored in memory 208, when executed by the processor 204, may enable the gaming machine 112 to provide game play functionality.

The nature of the network interface 212 may depend upon whether the network interface 212 is provided in cabinet-style gaming machine 112 or a mobile gaming machine 112. Examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the gaming machine 112 is connecting to a single gaming network 104 or multiple different types of gaming networks 104. For instance, the gaming machine 112 may be provided with both a wired network interface 212 and a wireless network interface 212 without departing from the scope of the present disclosure.

The user interface 216 may include a combination of user input devices and user output devices. For instance, the user interface 216 may include a display screen, speakers, buttons, levers, a touch-sensitive display, or any other device that is capable of enabling user 124 interaction with the gaming machine 112. The user interface 216 may also include one or more drivers for the various hardware components that enable user 124 interaction with the gaming machine 112.

The memory 208 may include one or multiple computer memory devices that are volatile or non-volatile. The memory 208 may be configured to store instruction sets that enable user interaction with the gaming machine 112 and that enable game play at the gaming machine 112. Examples of instruction sets that may be stored in the memory 208 include a game instruction set 220, a credit meter 224, a game history sharing instruction set, a wager strategy management instruction set 240, an automated wager strategy executable 244, and a game condition monitoring instruction set 248. In addition to the instruction sets, the memory 208 may also be configured to store a random number generator that is used by the game instruction set 220 to provide game outputs. The gaming machine 112 is also shown to include a mobile device communication instruction set 236 that may enable the gaming machine 112 to exchange electronic communications with a mobile device 128, either directly or indirectly. In addition to instruction sets, the memory 208 may also be configured to store a game history log 228 that includes historical game outcomes and time information associated with such outcomes. The historical game outcomes stored in the game history log 228 may represent each outcome of a game of chance executed by the game instruction set 220 and other information associated with each executed game of chance (e.g., timing information, wager information, etc.). As will be discussed in further detail herein, the game history sharing instruction set 232 along with the mobile device communication instruction set 236 may be configured to share game history messages with a mobile device 128 that includes some or all of the information contained in the game history log 228. It should also be appreciated that any of the instruction sets depicted as being included in the memory 208 of the gaming machine 112 may be provided in memory of other devices for execution by processors of those devices, such as the gaming server 116 and/or mobile device 128.

In some embodiments, the game instruction set 220, when executed by the processor 204, may enable the gaming machine 112 to facilitate one or more games of chance or skill and produce interactions between the user 124 and game of chance or skill. In some embodiments, the game instruction set 220 may include subroutines that present one or more graphics to the user via the user interface 216, subroutines that calculate whether a particular wager has resulted in a win or loss during the game of chance or skill, subroutines for determining payouts for the user in the event of a win during the first game of chance, subroutines for exchanging communications with another device, such as server 116, subroutines for determining bonus opportunities during game play, and any other subroutine useful in connection with facilitating game play at the gaming machine 112.

In some embodiments, the game instruction set 220 may include instructions that initiate and control a roulette wheel spin, initiate and control a card game, initiate and control a dice game, initiate and control a slot game, or execute any other type of game of chance or skill. The game instruction set 220 may also be configured to present outputs (e.g., as Graphical User Interface (GUI) elements) via a display screen when the game of chance is virtualized, includes a video output, or the like. The game instruction set 220 may also be configured to evaluate wagers relative to a particular game outcome to determine if any wagers result in a player win and/or perform any other evaluation desired to facilitate game play.

The credit meter 224 may correspond to an instruction set within the gaming machine 112 that facilitates a tracking of wager activity at the gaming machine 112. In some embodiments, the credit meter 224 may be used to store or log information related to various user activities and events that occur at the gaming machine 112. The types of information that may be maintained in the credit meter 224 include, without limitation, user information, available credit information, wager amount information, and other types of information that may or may not need to be recorded for purposes of accounting for wagers placed at the gaming machine 112 and payouts made for a user during a first game of chance played at the gaming machine 112.

In some embodiments, the credit meter 224 may be configured to track coin in activity, coin out activity, coin drop activity, jackpot paid activity, credits applied activity, external bonus payout activity, voucher in activity, voucher out activity, timing of events that occur at the gaming machine 112, and the like. In some embodiments, certain portions of the credit meter 224 may be updated in response to outcomes of a game of chance played at the gaming machine 112. Alternatively or additionally, the credit meter 224 may also be configured to account for and track wagers that were placed manually by a player 124 separately from wagers that were placed automatically or semi-automatically by the automated wager strategy executable 244. In some embodiments, the wager credit meter 224 may include one or more data flags that indicate whether a wager was placed manually or with assistance from the automated wager strategy executable 244 along with results for those wagers and conditions that led to the automated or semi-automated wager being placed.

The game history sharing instruction set 232 may be configured to operate in cooperation with the mobile device communication instruction set 236. Specifically, the game history sharing instruction set 232 may be configured to determine which portions of the game history log 228 should be shared with a mobile device 128 and when such information should be communicated to the mobile device 128. In some embodiments, the game history sharing instructions 232 may be configured to invoke the mobile device communication instruction set 236 to generate and send one or more messages to a mobile device 128 that include certain portions of the game history log 228. As a non-limiting example, the game history sharing instruction set 232 may retrieve the last ten historical game outcomes from the game history log 232 and provide that information to the mobile device communication instruction set 236 for inclusion in a message that is transmitted to a mobile device 124.

The mobile device communication instruction set 236, when executed by the processor 204, may enable the gaming machine 112 to communicate with the mobile device 128 or multiple mobile devices 128. In some embodiments, the mobile device communication instruction set 236 may include instructions that enable the gaming machine 112 to pair with a mobile device 128 and establish a communication channel with the mobile device 128 via the pairing. As an example, the mobile device communication instruction set 236 may include instructions that enable NFC, Bluetooth®, WiFi, or other types of communication protocols. It should be appreciated that the mobile device communication instruction set 236 may also be updated to reflect when a mobile device 128 is paired with the gaming machine 112 and such pairing information may include addressing information for the mobile device 128 and/or identification information associated with the user 124 of the mobile device 128. Alternatively or additionally, the mobile device communication instructions 236 may enable the gaming machine 112 to identify a user 124 of the mobile device 128, identify a loyalty account associated with the user 124 of the mobile device 128, exchange information (e.g., send or receive) with a loyalty application operating on the mobile device 128, or combinations thereof. In some embodiments, the mobile device communication instructions 236 may be configured to operate or drive the network interface 212 to facilitate direct or indirect communications with a mobile device 128.

The wager strategy management instruction set 240, when executed by the processor 204, may enable the gaming machine 112 to receive a desired wager strategy from a player and modify a behavior of the automated wager strategy executable 244 based on the player's defined wager strategy. In some embodiments, the wager strategy management instruction set 240 may be configured to receive a wager strategy message from the user 124 (e.g., communicated by via the mobile device 128) and extract a wager strategy defined by the user 124 in the wager strategy message. The wager strategy management instruction set 240 may then update a configuration of the automated wager strategy executable 244 based on the wager strategy extracted from the wager strategy message. As different wager strategies are received from different users 124 (or from the same user 124 deciding to change their wager strategy), the wager strategy management instruction set 240 may further refine or update the automated wager strategy executable 244. As can be appreciated, the wager strategy management instruction set 240 may be configured to manage wager strategies for a plurality of different users 124 simultaneously, even for the execution of a single game of chance by the game instruction set 220. Thus, the wager strategy management instruction set 240 may warehouse each player's 124 wager strategy individually and cause the automated wager strategy executable 244 to operate independently (but simultaneously) for each player's defined wager strategy. Thus, multiple automated or semi-automated wagers may be placed on a game of chance or skill by the automated wager strategy executable 244 based on the wager strategies being managed by the wager strategy management instruction set 240.

The game condition monitoring instruction set 248 may correspond to a set of instructions that operate as a subroutine for the wager strategy management instruction set 240 and/or automated wager strategy executable 244. As an example, the game condition monitoring instruction set 248 may be configured to monitor updates to the game history log 228 and determine if an action condition is triggered based on an update to the historical game outcomes stored in the game history log 228. The game condition monitoring instruction set 248 may also be configured to provide updates to game outcomes to the automated wager strategy executable 244 to assist the automated wager strategy executable 244 in determining whether, when, and to what extent a wager should be automatically or semi-automatically (e.g., with approval from a user 124) placed on a game of chance to be executed by the game instruction set 220. In some embodiments, the game condition monitoring instruction set 248 may be included as part of the automated wager strategy executable 244 to enable the automated wager strategy executable 244 to determine when to automatically place a wager for a user 124 or notify the user 124 of an opportunity to place a wager, based on the current wager strategy defined for the user 124 in the wager strategy management instruction set 240.

The gaming machine 112 is further shown to include a ticket issuance device 252, a ticket acceptance device 256, a cash in device 260, and a cash out device 264. The ticket issuance device 252 may be configured to print physical tickets, vouchers, or user loyalty cards. The ticket acceptance device 256 may be configured to receive, scan, and/or recognize information from an input physical ticket, voucher, or user loyalty card. In some embodiments, the ticket issuance device 252 and ticket acceptance device 256 may operate in concert with a common piece of hardware that both accepts and produces physical tickets, vouchers, or the like. Tickets or vouchers printed by ticket issuance device 252 and recognizable by the ticket acceptance device 256 may correspond to physical lottery tickets, casino vouchers, paper coupons, and the like. Alternatively or additionally, the ticket issuance device 252 and/or ticket acceptance device 256 may be connected to a card reading hardware. In such an embodiment, the ticket issuance device 252 and ticket acceptance device 256 may operate as a driver and/or firmware component for the card reader.

Similarly, the cash in device 260 and cash out device 264 may include or operate in concert with a coin slot or any other type of coin delivery mechanism. The cash in device 260 and cash out device 264 may include hardware, drivers, or firmware that facilitate receiving or distributing cash, tokens, bills, etc. In some embodiments, the cash in device 260 may be configured to determine an amount of cash (e.g., in coins, bills, etc.), an amount of tokens, an amount of chips, etc., input at the coin slot and convert the values into credits for playing games with the game instruction set 220. The cash out device 264 may correspond to hardware and software configured to output coins, tokens, bills, chips, etc. if a user decides to cash out or convert playing credits back into cash, tokens, bills, etc.

The gaming machine 112 may further include a card interface 268, which can provide hardware, software, and/or drivers that enable the gaming machine 112 to communicate with a player loyalty card, with a mobile device 128, or the like. In some embodiments, the card interface 268 may be integrated or part of the network interface 212 and may include components that facilitate contactless communications with a card, mobile device 128, or the like. Specific, but non-limiting examples of contactless communications that may be enabled by the card interface 268 include Bluetooth communications, Near Field Communications (NFC) communications, WiFi communications, or the like. In some embodiments, the card interface 268 may include a magstripe reader, SIM card reader, chip reader, or other set of components that enable contact-based communications with a card. It should be appreciated that the card interface 268 can be configured to enable communications with a card or mobile device 128 that is brought within a predetermined proximity of the gaming machine 112 or that is swiped/tapped/inserted into the card interface 268.

Figure 3:
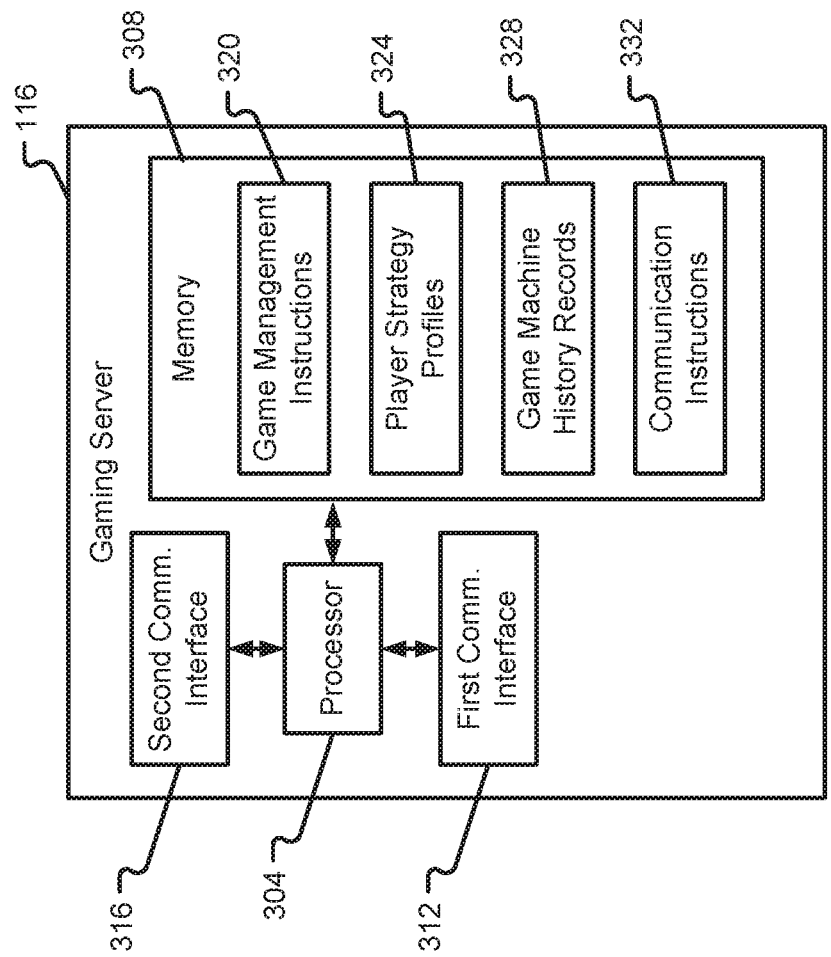
FIG. 3 illustrates a gaming server in accordance with embodiments of the present disclosure.

With reference now to FIG. 3, additional details of a gaming server 116 will be described in accordance with embodiments of the present disclosure. The gaming server 116 is shown to include a processor 304, memory 308, and a plurality of communication interfaces 312, 316. These resources may enable functionality of the gaming server 116 as will be described herein. For instance, the first communication interface 312 may provide the gaming server 116 with the ability to send and receive communication packets or the like over the gaming network 104. The first communication interface 312 may be provided as a network interface card (NIC), a network port, drivers for the same, and the like. Communications between the components of the gaming server 116 and other devices connected to the gaming network 104 may all flow through the first communication interface 312.

The gaming server 116 is also shown to include a second communication interface 316 that facilitates communications with the mobile devices 128 via the communication network 108. In some embodiments, the second communication interface 316 may be similar to the first communication interface 312. For instance, the second communication interface 316 may also include a NIC, network port, drivers for the same, and the like. In some embodiments, the first and second communication interfaces 312, 316 may be provided in a single physical component or set of components, but may correspond to different communication channels (e.g., software-defined channels, frequency-defined channels, amplitude-defined channels, etc.) that are used to send/receive different communications to the mobile devices 128 as compared to the gaming machines 112. In some embodiments, a single communication interface may facilitate communications with both the gaming machines 112 and mobile devices 128, especially if both devices communicate with the gaming server 116 via a common network.

The processor 304 may be similar or identical to the processor 204 and may correspond to one or many computer processing devices. For instance, the processor 304 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 304 may be provided as a microcontroller, microprocessor, Central Processing Unit (CPU), or plurality of microprocessors that are configured to execute the instruction sets stored in memory 308. Upon executing the instruction sets stored in memory 308, the processor 304 enables various authentication functions of the gaming server 116.

The memory 308 may be similar or identical to memory 208 and may include any type of computer memory device or collection of computer memory devices. The memory 308 may include volatile and/or non-volatile memory devices. Non-limiting examples of memory 308 include Random Access Memory (RAM), Read Only Memory (ROM), flash memory, Electronically-Erasable Programmable ROM (EEPROM), Dynamic RAM (DRAM), etc. The memory 308 may be configured to store the instruction sets depicted in addition to temporarily storing data for the processor 304 to execute various types of routines or functions.

The illustrative instruction sets that may be stored in memory 308 include, without limitation, a game management instruction set 320 and a communication instruction set 332. The memory 308 may also be configured to store data related to player wager strategy profiles 324 and game machine history records 328. Functions of the gaming server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the gaming server 116. Said another way, the particular instruction sets depicted in FIG. 3 should not be construed as limiting embodiments described herein.

In some embodiments, the game management instruction set 320 may be configured to manage the various games being played at the gaming machines 112 and/or mobile devices 128. In some embodiments, the game management instruction set 320 may be configured to observe and record the game outcomes at the gaming machines 112 and/or mobile device 128 and communicate information about such game outcomes to a user 124 (e.g., via their mobile device 128). The game management instruction set 320 may also be configured to store and update game machine history records 328 based on game outcome information received from gaming machines 112. In a more specific, but non-limiting, embodiment, the game management instruction set 320 may be configured to receive various game history logs 228 from different gaming machines 112 and store information from those game history logs 228 into the game machine history records 328. As discussed above, information from the game history logs 228 of a gaming machine 112 may be communicated directly to a mobile device 128 by the machine. However, it may also be possible for the gaming server 116 to communicate some information from a game history log 228 by referencing its game machine history records 328 and then communicating that information to a mobile device 128 via the communication network 108.

Additionally, the game management instruction set 320 may be configured to track and update various player strategy profiles 324 that are being stored by wager strategy management instruction sets 240 at different gaming machines 112. As an example, the gaming server 116 may be configured to receive information from gaming machines 112 describing when a user 124 updates their wager strategy, when a gaming machine 112 utilizes the automated wager strategy executable 244 in accordance with a user's wager strategy, and/or when a wager strategy is activated/deactivated at the gaming machine 112. This information may be stored as part of the player strategy profiles 324 and can be analyzed, from time to time, by the game management instruction set 320 to determine if any user(s) 124 are attempting to cheat or implement an otherwise illegal/unwanted wager strategy that could be detrimental to the user 124 or casino.

The communication instruction set 332, when executed by the processor 304, may enable the gaming server 116 to communicate with the other devices in the system 100. For instance, the communication instruction set 332 may be configured to modulate/demodulate communications exchanged over the gaming network 104 and/or communication network 108, determine timings associated with such communications, determine addresses associated with such communications, etc. In some embodiments, the communication instruction set 332 may be configured to allocate communication ports of the gaming server 116 for use as either the first or second communication interface 312, 316 as appropriate. The communication instruction set 332 may further be configured to generate messages in accordance with communication protocols used by the networks 104, 108 and to parse messages received via the networks 104, 108.

Figure 4:
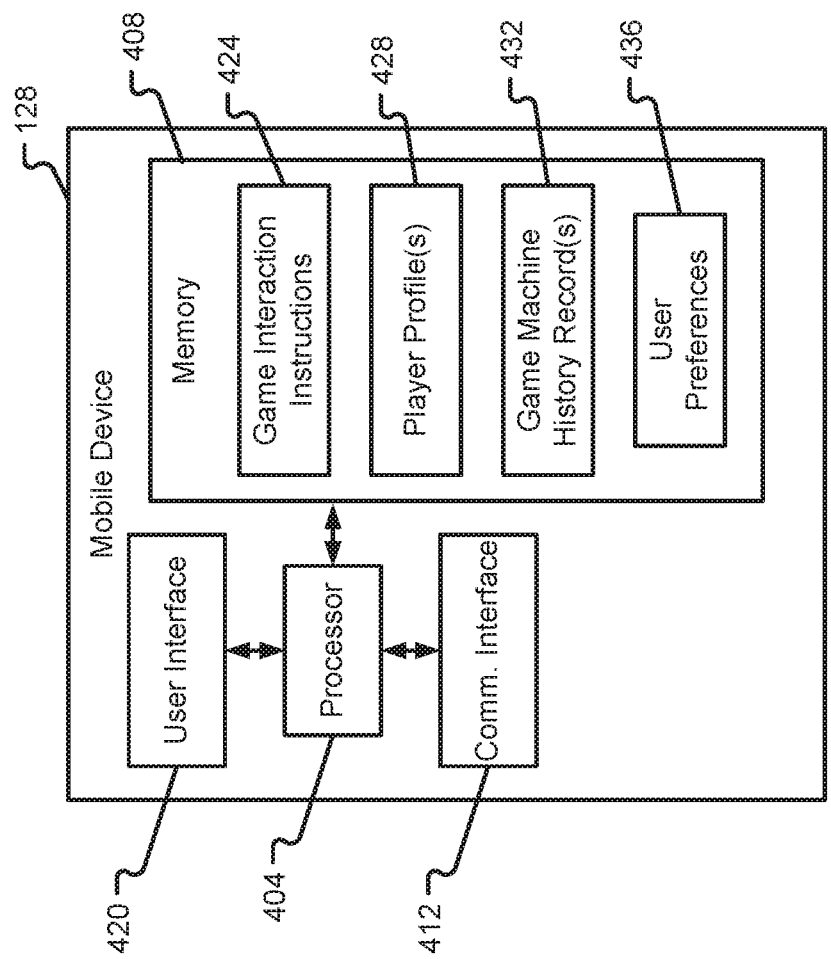
FIG. 4 illustrates a mobile device in accordance with embodiments of the present disclosure.

With reference now to FIG. 4, additional details of the components that may be included in a mobile device 128 will be described in accordance with at least some embodiments of the present disclosure. The mobile device 128 is shown to include a processor 404, memory 408, a communication interface 412, and a user interface 420. In some embodiments, the processor 404 may be similar or identical to any of the other processors 204, 304 depicted and described herein and may correspond to one or many microprocessors, CPUs, microcontrollers, Integrated Circuit (IC) chips, or the like. The processor 404 may be configured to execute one or more instruction sets stored in memory 408. In some embodiments, the instruction sets stored in memory 408, when executed by the processor 404, may enable the mobile device 128 to provide game play functionality, interact with gaming machines 112, pair with gaming machines 112, or any other type of desired functionality.

The communication interface 412 may be similar or identical to the network interface 212 and/or communication interfaces 312, 316 depicted and described herein. The nature of the communication interface 412 may depend upon the type of communication network 108 for which the mobile device 128 is configured. Examples of a suitable communication interfaces 412 include, without limitation, a WiFi antenna and driver circuit, a Bluetooth antenna and driver circuit, a cellular communication antenna and driver circuit, a modulator/demodulator, etc. The communication interface 412 may include one or multiple different network interfaces depending upon whether the mobile device 128 is connecting to a single communication network 108 or multiple different types of communication networks. For instance, the mobile device 128 may be provided with both a wired communication interface 412 and a wireless communication interface 412 without departing from the scope of the present disclosure.

The user interface 420 may include a combination of a user input and user output device. For instance, the user interface 420 may include a display device, a microphone, a speaker, a haptic feedback device, a light, a touch-sensitive display, a button, or a combination thereof. The user interface 420 may also include one or more drivers for the various hardware components that enable user interaction with the mobile device 128.

The memory 408 may be similar or identical to other memory 208, 308 depicted and described herein and may include one or multiple computer memory devices that are volatile or non-volatile. The memory 408 may be configured to store instruction sets that enable player interaction with the mobile device 128 and that enable game play at the mobile device 128. An illustrative instruction set that may be included in memory 408 is a game interaction instruction set 424. In some embodiments, the game interaction instruction set 424 may enable the mobile device 128 to communicate with a game executed by a gaming machine 112 and may also include instructions that allow the mobile device 124 to send wager strategy messages to the gaming machine 112, receive game history messages from the gaming machine 112, and receive outcome messages from the gaming machine 112. The game interaction instruction set 424 may also be configured to manage one or multiple player profiles 428 that store various wager strategies defined by the user 124. In some embodiments, the game interaction instruction set 424 may be configured to communicate a particular wager strategy to the gaming machine 112. The game interaction instruction set 424 may also be configured to receive a game history message from the gaming machine 112 and store some or all of the information from the game history message in the game machine history record(s) 432. Furthermore, as discussed above, the mobile device 128 may be configured to receive information from the gaming server 116 that describes one or many different game machine history records and that information may also be stored as part of the game machine history records 432 in memory 408. Said another way, the mobile device 128 may be configured to store partial or complete records of a game machine history (e.g., including a description of game outcomes) that can otherwise be stored in the gaming machine 112 and/or gaming server 116.

Although not shown, the memory 408 may also include a communication instruction set that, when executed by the processor 404, enables the mobile device 128 to communicate via the communication network 108. In some embodiments, the communication instruction set may be similar or identical to the communication instruction set 332 and may be particular to the type of communication network 108 used by the mobile device 128. As an example, the communication instruction set on the mobile device 128 may be configured to enable cellular, WiFi, and/or Bluetooth communications with other devices. The communication instruction set may follow predefined communication protocols and, in some embodiments, may enable the mobile device to remain paired with a gaming machine 112 as long as the mobile device 128 is within a predetermined proximity (e.g., 20-30 feet, an NFC communication range, or a Bluetooth communication range).

The user preferences 436 may correspond to gaming, device, and/or wager preferences that are desired by the user 124 of the mobile device 128. In some embodiments, where the mobile device 128 is not owned by the user 124, but rather is loaned to the user 124 by a casino operator, the user preferences 436 may include default preferences defined by the casino as well as other preferences that are defined by the user 124 after receiving the mobile device 128. The user preferences 436 may alternatively or additionally relate to communication preferences that drive operation of the communication instruction set. In some embodiments, the user preferences 436 may include game play preferences, wager strategies, and the like that enable automated or semi-automated wager placement at the gaming machine 112.

The gaming machine 112 and mobile device 128 may be configured to communicate with one another and, in some embodiments, the mobile device 128 may provide some or all of the user preferences 436 to the gaming machine 112 for use during a game play session or at least until the user 124 leaves the gaming machine 112 (e.g., as determined by the mobile device 128 leaving the predetermined proximity of the gaming machine 112). Until such time that the user 124 leaves the gaming machine 112, the wager strategy stored at the gaming machine 112 and managed by the wager strategy management instruction set 240 may continue to be implemented and executed vis-à-vis the automated wager strategy executable 244.

With reference now to FIGS. 5-9, various operations of a gaming machine 112, gaming server 116, and/or mobile device 128 will be described in accordance with at least some embodiments of the present disclosure. It should be appreciated that any of the methods may be combined or separated and that any of the steps of any method disclosed herein can be included in other methods. Similarly, any of the steps of any method may be performed in a different order or in parallel, depending upon capabilities of the device(s) implementing the methods. Further still, any method or portion of a method depicted and described herein may be performed by components of a gaming machine 112, by components of a gaming server 116, by components of a mobile device 128, or a combination thereof.

Figure 5:
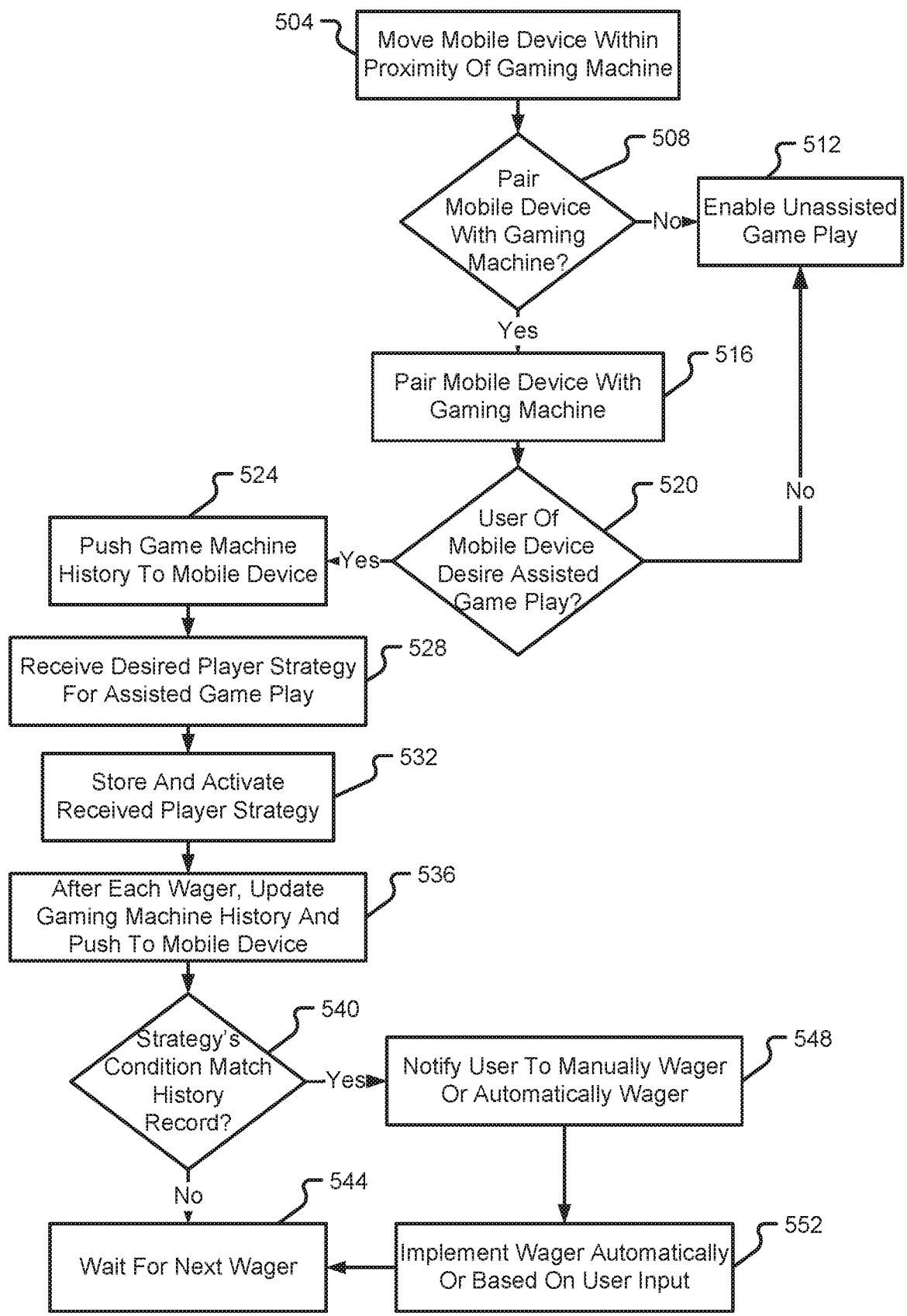
FIG. 5 is a flow chart illustrating a first gaming method in accordance with embodiments of the present disclosure.

With reference initially to FIG. 5, a first gaming method will be described in accordance with at least some embodiments of the present disclosure. The method begins when a user 124 moves their mobile device 128 within a predetermined proximity of a gaming machine 112 (step 504). In some embodiments, the predetermined proximity corresponds to a communication range required for the mobile device 128 to communicate directly with the gaming machine 112 (e.g., an NFC communication range, a Bluetooth communication range, a WiFi communication range, etc.). Brining the mobile device 128 within proximity of the gaming machine 112 may cause the method to continue by querying the user 124 whether or not they desire to pair their mobile device 128 with the gaming machine 112 (step 508). If the query is answered negatively, then the method continues by allowing the user 124 to play the game at the gaming machine 112 in an unassisted manner (step 512).

If, however, the query of step 508 is answered affirmatively, then the method continues with the mobile device 128 pairing with the gaming machine 112 (step 516). Thereafter, the method continues by determining whether or not the user 124 of the mobile device 128 desires an assisted (e.g., automated or semi-automated) game play experience with the gaming machine 112 (step 520). The query of step 520 may be answered based on a user's 124 response to a text-based request sent to the mobile device 128 via a communication channel establish via the pairing. Alternatively or additionally, the user 124 may provide one or more inputs directly to the gaming machine 112 (e.g., pressing a button or selecting a GUI from a display screen of the gaming machine 112) to answer the query of step 520. There may be other embodiments where the user's 124 mobile device 128 provides an automated response to the query, for example, if the user's 124 preferences 436 define that the user 124 desires to engage in an automated or semi-automated game play whenever the mobile device 128 pairs with a gaming machine 112. If the query of step 520 is answered negatively, then the method may proceed to step 512.

If the query of step 520 is answered positively, then the method may continue with the gaming machine 112 pushing some of all of the information from its game history log 228 to the mobile device 128 (step 524). In some embodiments, the game history log 228 may be provided to the mobile device 128 via a game history message that includes a game history description for a finite set of game outcomes that have occurred at the gaming machine 112.

When the mobile device 128 receives the game history message, this may prompt the mobile device 128 to ask the user 124 for a desired wager strategy to apply during the gaming session at the gaming machine 112. The user 124 may select a desired wager strategy and send the desired wager strategy to the gaming machine 112 via a wager strategy message (again via the communication channel established vis-à-vis the pairing of the gaming machine 112 and mobile device 128). The method will continue when the gaming machine 112 receives the wager strategy message and extracts the desired wager strategy of the user 124 (step 528). The desired wager strategy may be stored and managed by the wager strategy management instruction set 240, which may reside in the gaming machine 112, the gaming server 116, the mobile device 128, or a combination thereof (step 532).

As part of managing and applying the wager strategy, the wager strategy management instruction set 240 may monitor historical game outcomes of the game executed by the game instruction set 220. Application of the wager strategy may be specifically invoked by the automated wager strategy executable 244. In some embodiments, wagers may be placed in an automated or semi-automated fashion according to the wager strategy defined by the user 124.

After each game outcome and/or after each wager, the game history log 228 may be updated (step 536). Alternatively or additionally, the updated portion of the game history log 228 (or simply information from the game outcome) after each wager may be pushed to the mobile device 128, again using the communication channel established directly between the gaming machine 112 and mobile device 128.

The method may further continue after each wager and after the game history log 228 has been updated by reassessing whether the user's 124 wager strategy has any activity condition that is satisfied by the game outcome history and, possibly, based on the latest game outcome (step 540). If the action condition is satisfied for one or more wager strategies, then the method may continue with the gaming machine 112 issuing a notification to the user 124 informing the user 124 that the action condition has been satisfied and requesting whether a wager should be placed for the user 124 on the next game of chance (step 548). The user 124 may then be allowed to place a wager directly at the gaming machine 112 or by providing an appropriate input at the mobile device 128 (step 552). Alternatively in steps 548 and 552, if defined by the user's 124 wager strategy, the wager strategy management instruction set 240 may automatically place a wager for the user 124 and then notify the use 124 that an automated wager has been placed in accordance with the wager strategy. This notification may also include a time at which the wager was placed, a description of the action condition that triggered the wager, an amount of the wager, a type of the wager, and any other information desirable for the user 124 to know in connection with the wager 124.

Thereafter, of if the query of step 540 is answered negatively, the method continues with the gaming machine 112 waiting for the next opportunity to place a wager (step 544). As can be appreciated, the method may return back to step 536, 520, or 508 to determine whether the user 124 continues to desire execution of the automated or semi-automated wager assistance feature.

Figure 6:
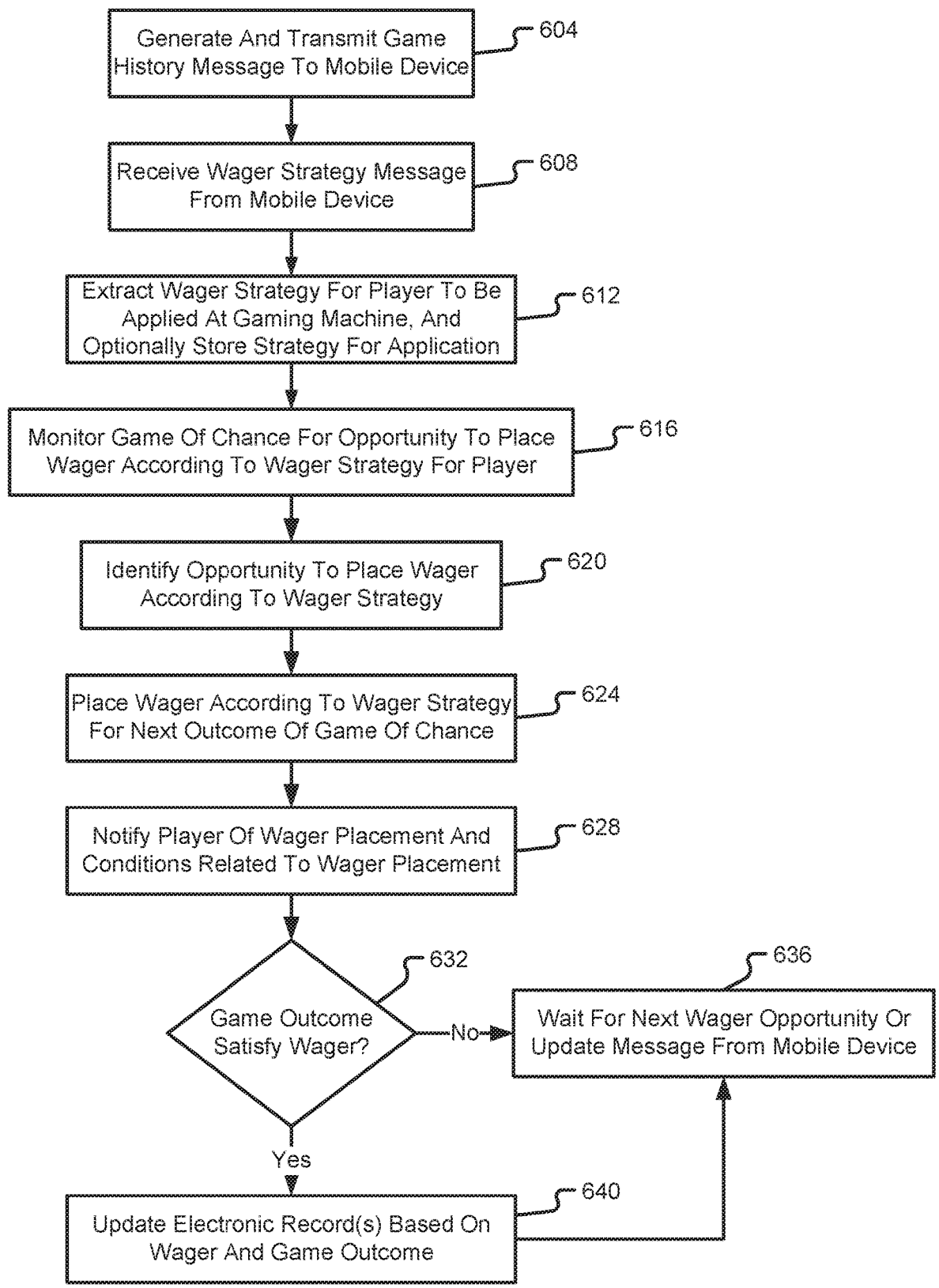
FIG. 6 is a flow chart illustrating a second gaming method in accordance with embodiments of the present disclosure.

With reference now to FIG. 6, additional details of another gaming method will be described in accordance with at least some embodiments of the present disclosure. The method begins with the gaming machine 112 generating and transmitting a game history message to the mobile device 128 (step 604). The game history message may include some or all of the machine's 112 game history log 228 for assessment by the mobile device 128 or a user 124 of the mobile device 128.

The method continues with the gaming machine 112 receiving a wager strategy message from the mobile device 128 (step 608). The gaming machine 112 may then extract the wager strategy for the user 124 from the wager strategy message (step 612). This step may also include, as an option, having the extracted wager strategy stored and applied by the wager strategy management instruction set 240. Such application and storage of the wager strategy may be performed at the gaming machine 112, at the mobile device 128, at the gaming server 116, or at a combination thereof.

The wager strategy management instruction set 240, possibly with the assistance of the automated wager strategy executable 244 and game condition monitoring instruction set 248, may be configured to monitor the game of chance for an opportunity to place a wager according to the wager strategy extracted from the wager strategy message (step 616). Again, this and other steps may be performed within the gaming machine 112, the gaming server 116, and/or the mobile device 128. As the game of chance is executed, the opportunity to place a wager may be identified (step 620). The identification of a wager opportunity may be based upon an action condition being satisfied by a particular game outcome or a set of historical game outcomes. Once the opportunity has been identified, the method continues with the automated wager strategy executable 244 placing the wager for the next outcome of the game of chance (step 624). In some embodiments, the type of wager and the amount of the wager may also be defined in the wager strategy and could depend upon the type of game outcome or set of historical game outcomes that triggered the wager.

The method then continues with the gaming machine 112 notifying the user 124 of the wager placement and the action condition that resulted in the wager placement (step 628). The method then continues with the game instruction set 220 executing a next game of chance or skill and determining whether any wagers were won based on the latest game outcome (step 632). This analysis may include an analysis of manually placed wagers as well as wagers placed by the automated wager strategy executable (with or without user 124 input). If a user's 124 wager corresponds to a winning wager based on the most recent game outcome, the method continues by paying the winning wager and updating one or more electronic records based on the wager and game outcome (step 640). In some embodiments, the electronic records that may be updated to reflect the winning wager may include the wager credit meter 224 and/or game history log 228. Thereafter, or if there was not winning wager, the method proceeds with the wager strategy management instruction set 240 waiting for the next opportunity to place a wager for the user 124 (step 636). Alternatively or additionally, this step may include waiting for another update message from the mobile device 128 indicating that the user 124 wants to change their wager strategy or discontinue using the automated/semi-automated wager assistance feature offered by the wager strategy management instruction set 240/automated wager strategy executable 244/game condition monitoring instructions 248.

As a specific, but non-limiting example of implementing the above-noted method (or other methods), the gaming server 116 may be configured to store a user's 124 wager strategy in addition to storing game machine history records 328. After each wager at a gaming machine 112, the gaming machine 112 may send the latest results of the wager and outcomes to the gaming server 116 for analysis. If the gaming server 116 determines that the user's 124 wager strategy condition matches the activity in the history records 328, the gaming server 116 may issue a notification to the mobile device 128 of the user 124 asking if the user 124 desires to manually place a wager. Alternatively, the notification provided to the mobile device 128 may indicate that an automated wager has been placed in accordance with the wager strategy. Meanwhile, the gaming server 116 may also update its history records 328, which can be pushed to the mobile device 128 either directly or back through the gaming machine 112.

Figure 7:
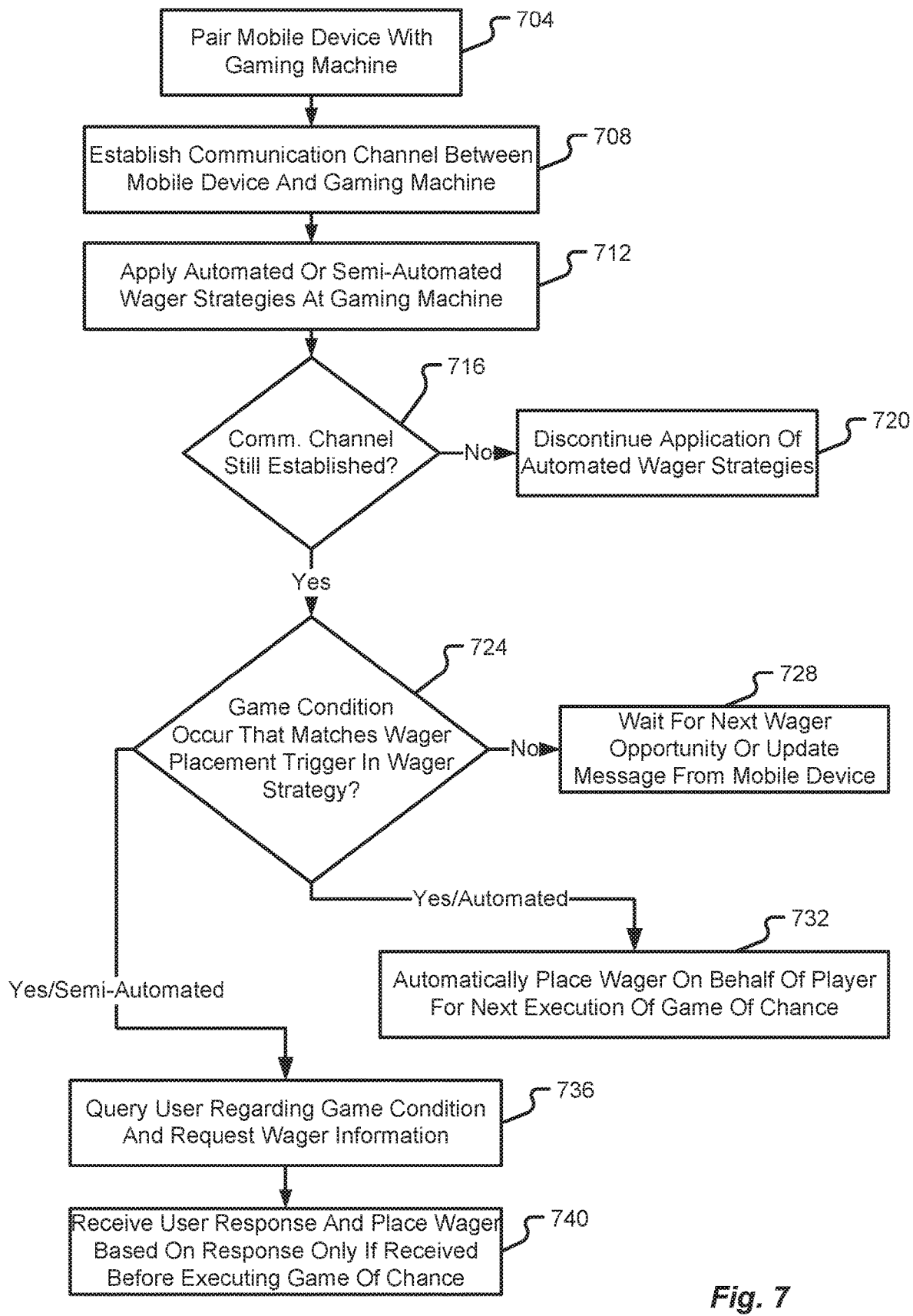
FIG. 7 is a flow chart illustrating a third gaming method in accordance with embodiments of the present disclosure.

With reference now to FIG. 7, details of another gaming method will be described in accordance with at least some embodiments of the present disclosure. The method begins when a mobile device 128 is paired with a gaming machine 112 (step 704). The method then continues with the mobile device 128 and gaming machine 112 establishing a communication channel based on the pairing (step 708). The communication channel may correspond to a direct communication channel between the two devices or may include one or more intermediary devices used for message routing/protocol conversion.

The method then continues with the gaming machine 112 applying an automated or semi-automated wager strategy (step 712). In some embodiments, the wager strategy may be applied by the gaming machine 112 in an automated or semi-automated fashion based on a wager strategy message received from the user's 124 mobile device 128. The automated or semi-automated wager strategy may continue to be applied by the gaming machine 112 as long as the communication channel remains established between the gaming machine 112 and mobile device 128 (step 716). Existence of the communication channel may be used to infer that the user 124 is still at the gaming machine 112 and desirous of playing games of chance or skill at the gaming machine 112. If the communication channel is no longer established (e.g., becomes terminated), then the gaming machine 112 may discontinue applying the automated or semi-automated wager strategy (step 720).

However, if the communication channel remains established, then the method may continue with the wager strategy management instruction set 240 continuing to monitor the game outcomes to determine if another action condition has been satisfied and an appropriate action (e.g., wager placement) should be performed in accordance with the wager strategy (step 724). If an action condition is not satisfied or triggered based on game outcomes, then the method will wait for the next wager opportunity (step 728). Alternatively or additionally, the method may return back to step 716 to ensure that the gaming machine 112 and mobile device 128 are still paired with one another and the communication channel is still established therebetween.

Referring back to step 724, if an action condition is triggered, then the method may proceed in a manner dependent upon whether the wager strategy defines an automated or semi-automated approach. If the wager strategy defines that a wager can be placed in an automated fashion (e.g., without requiring further input or permission from the user 124), then the method continues with the automated wager strategy executable placing a wager on behalf of the user 124 for the next occurrence of the game (step 732). However, if the wager strategy defines that at least some user 124 input is desired before placing a wager, then the method proceeds with the gaming machine 112 sending a query message to the mobile device 128 regarding the current game condition and requesting user input about whether or not a wager should be placed on the next occurrence of the game of chance (step 736). Based on the user's response (or lack thereof), the method continues by placing a wager in accordance with the inputs received from the use and/or not placing a wager on the next occurrence of the game of chance (step 740). In some embodiments, the gaming machine 112 may check to determine that a response to the query message is received prior to executing the game of chance. If the response is not timely received, then no wager may be placed on that particular game of chance and the method may return back to step 716.

Figure 8:
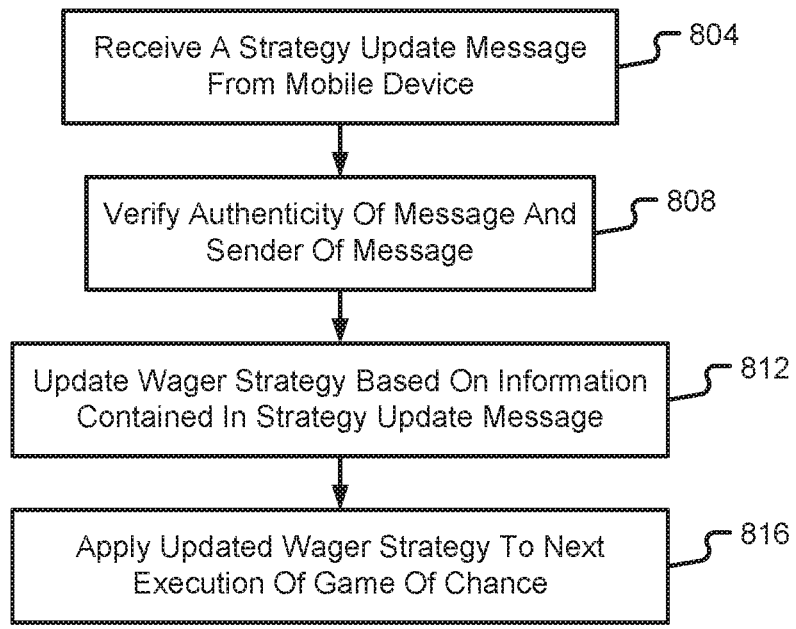
FIG. 8 is a flow chart illustrating a fourth gaming method in accordance with embodiments of the present disclosure.

Referring now to FIG. 8, details of another gaming method will be described in accordance with at least some embodiments of the present disclosure. The method begins when a gaming machine 112 receives a strategy update message from a mobile device 128 (step 804). The gaming machine 112 may invoke the wager strategy management instruction set 240 to analyze the strategy update message and determine whether or not the message corresponds to a valid/authentic message (step 808). In some embodiments, analysis of message authenticity may involve analyzing an address of the mobile device 128 that sent the message (to determine if the address corresponds to a known or trusted address), analyzing a format of the message (to determine if the format corresponds to an expected, known, or trusted format), analyzing information about the user 124 contained in the message, or combinations thereof.

If the message is verified as authentic, the method continues with the wager strategy management instruction set updating the automated wager strategy executable in accordance with the update(s) defined in the strategy update message (step 812). In some embodiments, a strategy update message may correspond to a new version of a wager strategy message rather than a different type of update message. In such a situation, the wager strategy management instruction set 240 may be sure to apply the wager strategy from the wager strategy message that is most recently received at the gaming machine 112 (step 816).

Figure 9:
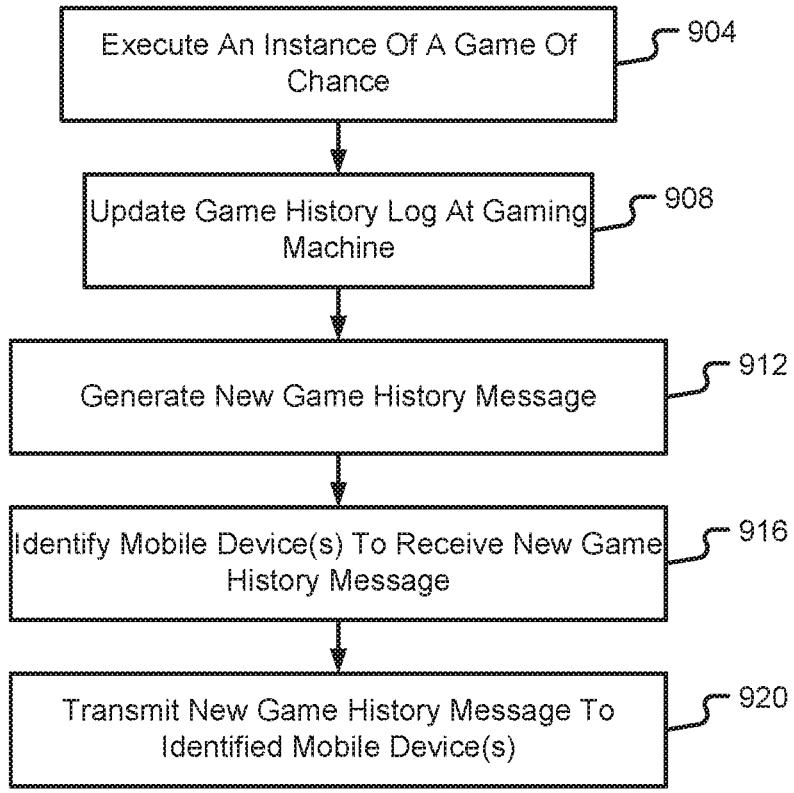
FIG. 9 is a flow chart illustrating a fifth gaming method in accordance with embodiments of the present disclosure.

With reference now to FIG. 9, details of another gaming method will be described in accordance with at least some embodiments of the present disclosure. The method begins with the game instruction set 220 executing an instance of a game of chance (step 904). The game of chance may correspond to a card game, table game, dice game, roulette game, video game, video poker game, slot game, lottery game, keno game, combinations thereof, or the like.

After the game has been executed, the gaming machine 112 may update the game history log 228 with information describing the outcome of the latest execution of the game of chance (step 908). Information that may be included in the update of the game history log 228 may include a description of the game of chance, wagers placed on the game of chance, time at which the game of chance was executed, a machine identifier assigned to the gaming machine 112, mobile device(s) 128 that are currently paired with the gaming machine 112, wager strategies being executed by the wager strategy management instruction set 240, etc.

After the game history log 228 has been updated, the method continues with the gaming machine 112 generating a new game history message (step 912) and identifying one or more mobile devices 128 to receive the new game history message (step 916). In some embodiments, the identified mobile devices 128 may only correspond to those devices that are currently paired with the gaming machine 112 and that have established a communication channel with the gaming machine 112. Alternatively, a mobile device 128 that is not directly paired with the gaming machine 112 may be identified as a target for the game history message, but the message may need to be transmitted to the mobile device 128 by the gaming server 116 over the communication network 108.

The method then continues with the gaming machine 112 causing the new game history message to be transmitted to the identified mobile devices (step 920). The communication channel established between a mobile device 128 and the gaming machine 112 may be used to transmit the new game history message. Alternatively or additionally, the gaming sever 116 may be responsible for transmitting the new game history message.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method of facilitating player interactions with a gaming machine, the method comprising:
   generating, with a processor of the gaming machine, a game history message for delivery to a mobile device, wherein the game history message comprises a game history description for a finite set of game outcomes that have occurred at the gaming machine;
   transmitting, with a communication interface of the gaming machine, the game history message to the mobile device;
   receiving, with the communication interface, a wager strategy message from the mobile device;
   extracting, with the processor and from the wager strategy message, a wager strategy for the player to be applied at the gaming machine for a game of chance to be played after receiving the wager strategy message;
   executing, with the processor, the game of chance, wherein executing the game of chance comprises placing a wager for the player on the game of chance in accordance with the wager strategy extracted from the wager strategy message;
   determining, with the processor, an outcome for the game of chance and an outcome specific to the wager placed for the player; and
   notifying, with the processor, the mobile device of the player of the outcome specific to the wager placed for the player.

2. The method of claim 1, wherein the communication information comprises identification information for the mobile device, the method further comprising:
   establishing, with the processor, a pairing relationship between the gaming machine and the mobile device based on the identification information for the mobile device;
   defining, with the processor, a communication channel between the gaming machine and the mobile device based on the pairing relationship; and
   pushing the game history message to the mobile device via the communication channel.

3. The method of claim 2, further comprising:
   generating, with the processor, an outcome message for the player that includes information notifying the player of the outcome specific to the wager placed for the player; and
   pushing the outcome message to the mobile device via the communication channel.

4. The method of claim 2, wherein the communication channel comprises a proximity-based communication channel that persists as long as the mobile device is operational and within a predetermined proximity of the gaming machine.

5. The method of claim 4, further comprising:
determining, with the processor, that the wager strategy comprises a defined game condition and an associated game action to take in response to the defined game condition occurring;
determining, with the processor, that the defined game condition occurred while executing the game of chance;
determining that the communication channel is still defined between the gaming machine and the mobile device; and
automatically placing the wager for the player with the processor based on: (i) determining that the defined game condition occurred while executing the game of chance and (ii) determining that the communication channel is still defined between the gaming machine and the mobile device, wherein automatically placing the wager is performed without providing an additional query to the player requesting whether or not to place the wager.

6. The method of claim 5, wherein the wager is automatically placed with a predefined wager amount that is included in the wager strategy.

7. The method of claim 1, further comprising:
determining, with the processor, that the wager strategy matches a condition in the game hi story description;
providing, with the processor and via the communication interface, a query message to the mobile device that includes an alert that the wager strategy matches the condition in the game history description and that also includes a request for the player to approve the wager;
receiving, with the processor and via the communication interface, a response to the query message that includes an approval from the player to place the wager; and
determining, with the processor, that the response to the query message is received prior to executing the game of chance.

8. The method of claim 1, further comprising:
receiving, with the processor and via the communication interface, a strategy update message from the mobile device; and
updating, with the processor, the wager strategy based on information contained in the strategy update message.

9. The method of claim 1, further comprising:
after executing the game of chance, updating, with the processor, the game history description to include the outcome of the game of chance; and
generating, with the processor, a new game history message for delivery to the mobile device, wherein the new game history message comprises the game history description updated to include the outcome of the game of chance in the finite set of game outcomes that have occurred at the gaming machine; and
transmitting, with the communication interface of the gaming machine, the new game history message to the mobile device.

10. The method of claim 1, wherein the finite set of game outcomes comprises a plurality of game outcomes that have occurred within a predefined amount of time and wherein notifying the player comprises rendering an output with a user interface of the gaming machine that indicates the outcome specific to the wager placed for the player.

11. A gaming machine, comprising:
a communication interface;
a processor coupled with the communication interface; and
a computer-readable storage medium, coupled with the processor, comprising instructions that are executable by the processor, wherein the instructions comprise:
instructions that execute a game of chance;
instructions that generate a game history message for delivery to a mobile device of a player, wherein the game history message comprises a game history description;
instructions that transmit, via the communication interface, the game history message to the mobile device;
instructions that receive a wager strategy message from the mobile device and then extract a wager strategy for the player to be applied at the gaming machine during execution of the game of chance to be played after receiving the wager strategy message;
instructions that determine, after execution of the game of chance, an outcome for the game of chance and an outcome specific to a wager placed for the player in accordance with the wager strategy; and
instructions that notify the player of the outcome specific to the wager placed for the player.

12. The gaming machine of claim 11, wherein the game history description comprises information for a finite set of game outcomes that have occurred at the gaming machine and wherein the instructions further comprise:
instructions that pair the gaming machine with the mobile device;
instructions that cause the wager to be placed for the player automatically and in accordance with the wager strategy; and
instructions that limit the automatic placement of the wager based on the gaming machine being paired with the mobile device.

13. The gaming machine of claim 12, wherein the instructions further comprise:
instructions that push additional game history messages to the mobile device as long as the gaming machine is paired with the mobile device.

14. The gaming machine of claim 12, wherein the instructions further comprise:
instructions that determine the wager strategy comprises a defined game condition and an associated game action to take in response to the defined game condition occurring; and
instructions that determine the defined game condition occurred while executing the game of chance, wherein the instructions that limit the automatic placement of the wager based on the gaming machine being paired with the mobile device further limit the automatic placement of the wager based on determining that the defined game condition occurred while executing the game of chance, and wherein automatically placing the wager is performed without providing an additional query to the player requesting whether or not to place the wager.

15. The gaming machine of claim 11, wherein the instructions further comprise:
instructions that determine the wager strategy matches a condition in the game history description;
instructions that provide a query message to the mobile device that includes an alert that the wager strategy matches the condition in the game history description and that also includes a request for the player to approve the wager;

instructions that receive a response to the query message that includes an approval from the player to place the wager; and instructions that determine the response to the query message is received prior to executing the game of chance.

16. The gaming machine of claim 11, wherein the instructions further comprise:

instructions that receive a strategy update message from the mobile device; and instructions that update the wager strategy based on information contained in the strategy update message.

17. A system, comprising:

a processor; and a computer-readable storage medium, coupled with the processor, comprising instructions that are executable by the processor, wherein the instructions comprise:

instructions that pair a mobile device of a player with a gaming machine;

instructions that generate a game history message for delivery to the mobile device, wherein the game history message comprises a game history description for a finite set of game outcomes that have occurred at the gaming machine;

instructions that transmit the game history message to the mobile device;

instructions that receive a wager strategy message from the mobile device and then extract a wager strategy for the player to be applied at the gaming machine during execution of a game of chance to be played after receiving the wager strategy message;

instructions that determine, after execution of the game of chance, an outcome for the game of chance and an outcome specific to a wager automatically placed for the player in accordance with the wager strategy; and instructions that notify the player of the outcome specific to the wager placed for the player.

18. The system of claim 17, wherein the instructions further comprise:

instructions that limit the automatic placement of the wager based on the gaming machine being paired with the mobile device.

19. The system of claim 18, wherein the instructions further comprise:

instructions that determine the wager strategy comprises a defined game condition and an associated game action to take in response to the defined game condition occurring; and instructions that determine the defined game condition occurred while executing the game of chance, wherein the instructions that limit the automatic placement of the wager based on the gaming machine being paired with the mobile device further limit the automatic placement of the wager based on determining that the defined game condition occurred while executing the game of chance, and wherein automatically placing the wager is performed without providing an additional query to the player requesting whether or not to place the wager.

20. The system of claim 17, further comprising:

instructions that determine the wager strategy matches a condition in the game history description;

instructions that provide a query message to the mobile device that includes an alert that the wager strategy matches the condition in the game history description and that also includes a request for the player to approve the wager;

instructions that receive a response to the query message that includes an approval from the player to place the wager; and instructions that determine the response to the query message is received prior to executing the game of chance.

* * * * *